United States Patent
Acheritobehere et al.

(10) Patent No.: US 9,500,776 B2
(45) Date of Patent: *Nov. 22, 2016

(54) OPTICAL ARTICLE HAVING A DUAL LAYER TEMPORARY COATING

(75) Inventors: Hervé Acheritobehere, Charenton-le-Pont (FR); Peggy Coue, Charenton-le-Pont (FR); Chefik Habassi, Charenton-le-Pont (FR); Yannick Moysan, Charenton-le-Pont (FR)

(73) Assignee: ESSILOR INTERNATIONAL (COMPAGNIE GENERALE D'OPTIQUE), Charenton-le-Pont (FR)

(*) Notice: Subject to any disclaimer, the term of this patent is extended or adjusted under 35 U.S.C. 154(b) by 738 days.

This patent is subject to a terminal disclaimer.

(21) Appl. No.: 12/676,688

(22) PCT Filed: Sep. 12, 2008

(86) PCT No.: PCT/FR2008/051636
§ 371 (c)(1),
(2), (4) Date: Mar. 5, 2010

(87) PCT Pub. No.: WO2009/047422
PCT Pub. Date: Apr. 16, 2009

(65) Prior Publication Data
US 2010/0310874 A1    Dec. 9, 2010

(30) Foreign Application Priority Data
Sep. 14, 2007 (FR) ..................... 07 57559

(51) Int. Cl.
G02B 1/10 (2015.01)
B32B 17/08 (2006.01)
B32B 27/08 (2006.01)
C03C 17/42 (2006.01)

(52) U.S. Cl.
CPC .......... G02B 1/105 (2013.01); Y10T 428/3188 (2015.04); Y10T 428/31511 (2015.04); Y10T 428/31533 (2015.04); Y10T 428/31551 (2015.04); Y10T 428/31565 (2015.04); Y10T 428/31573 (2015.04); Y10T 428/31587 (2015.04); Y10T 428/31591 (2015.04); Y10T 428/31797 (2015.04); Y10T 428/31855 (2015.04); Y10T 428/31924 (2015.04); Y10T 428/31928 (2015.04)

(58) Field of Classification Search
None
See application file for complete search history.

(56) References Cited

U.S. PATENT DOCUMENTS

| 4,707,208 | A | * | 11/1987 | Crumbach | B29C 51/16 156/212 |
| 5,945,462 | A | * | 8/1999 | Salamon | C08F 290/06 522/37 |
| 6,063,861 | A | * | 5/2000 | Irle et al. | 524/591 |
| 6,149,750 | A | * | 11/2000 | Parish, Jr. | B24B 13/0057 156/154 |
| 6,183,872 | B1 | * | 2/2001 | Tanaka et al. | 428/429 |
| 6,896,928 | B2 | | 5/2005 | Allaire et al. | 427/154 |
| 8,562,781 | B2 | * | 10/2013 | Habassi | B29D 11/00432 156/247 |
| 2003/0068492 | A1 | * | 4/2003 | Husemann et al. | 428/355 AC |
| 2005/0084783 | A1 | * | 4/2005 | Yau et al. | 430/66 |
| 2005/0115923 | A1 | * | 6/2005 | Lacan et al. | 216/26 |
| 2006/0169407 | A1 | * | 8/2006 | Jiang | 156/308.6 |
| 2006/0244910 | A1 | * | 11/2006 | Nam | G02B 1/105 351/159.57 |
| 2009/0213322 | A1 | * | 8/2009 | Urabe et al. | 351/44 |
| 2010/0053547 | A1 | * | 3/2010 | Baude | G02B 27/0006 351/159.01 |

FOREIGN PATENT DOCUMENTS

| WO | WO 02/092524 | 11/2002 |
| WO | WO 03/057641 | 7/2003 |
| WO | WO 2004/110946 | 12/2004 |
| WO | WO 2005/015270 | 2/2005 |
| WO | WO 2005/031441 | 4/2005 |
| WO | WO 2006092002 A1 * | 9/2006 |
| WO | WO 2007/071700 | 6/2007 |

OTHER PUBLICATIONS

DSM, NeoRad NR-3709 Product Data Sheet, DSM Coating Resins, Jan. 13, 2015, pp. 1-5.*

* cited by examiner

Primary Examiner — Callie Shosho
Assistant Examiner — Patrick English
(74) Attorney, Agent, or Firm — Norton Rose Fulbright US LLP

(57) ABSTRACT

Disclosed is an optical article comprising on at least one of its main surfaces an outer hydrophobic and/or oleophobic coating and in direct contact with the outer hydrophobic and/or oleophobic coating a dual-layer temporary coating, wherein the dual-layer temporary coating is removable and comprises: a first layer, in direct contact with the outer hydrophobic and/or oleophobic coating comprising halogenated olefin polymers or polyurethanes; and a water barrier second layer comprising a polymer or polymer mixture acting as a water barrier deposited on the first layer comprising at least one vinyl polymer, polyepoxide, polyepisulfide, polyester, polyether, polyester-ether, poly(meth)acrylate, polythio(meth)acrylate, styrene polymer, or cellulosic polymer.

13 Claims, No Drawings

OPTICAL ARTICLE HAVING A DUAL LAYER TEMPORARY COATING

This application is a national phase application under 35 U.S.C. §371 of International Application No. PCT/FR2008/051636 filed 12 Sep. 2008, which claims priority to French Application No. 0757559 filed 14 Sep. 2007. The entire text of each of the above-referenced disclosures is specifically incorporated herein by reference without disclaimer.

Generally speaking, the present invention relates to the optics article field, especially to lenses, more particularly to ophthalmic lenses, provided with an outer coating having hydrophobic and/or oleophobic properties (top coat).

Such outer hydrophobic and/or oleophobic coatings are well known in the art.

Such outer hydrophobic and/or oleophobic coatings, that are typically associated with antireflection coatings, are intended to make the ophthalmic lens less prone to fouling. It is most of the time a material of the fluorosilane type, which reduces the surface energy so as to prevent greasy soils from adhering, thus making them easier to remove.

One of the problems that are linked to these outer hydrophobic and/or oleophobic coatings lies in their efficiency that may be such that the interface adhesion between an adhesive pad and the surface of the hydrophobic and/or oleophobic coating required for mounting the lenses during an edging operation may get affected, or even impeded.

The last finish step for making an ophthalmic lens is the step of edging, which consists in machining the edge or the periphery of the lens to conform the same to the required dimensions and shape for adapting it to the eyeglass frame within which it is intended to be mounted.

The edging is effected on an automated grinder comprising diamond wheels which perform the machining such as defined hereabove, and the lens to be edged should therefore be reliably clamped in the grinder.

To do this, the first step consists in fixing a chuck in the center of the lens convex surface by using an adhesive pad such as a double-sided adhesive pad. The adhesive used is of the PSA type, that is to say a pressure sensitive adhesive.

The chuck to which the lens adheres through the adhesive pad is then mechanically fixed along the mounting axis of the grinder and an axial arm is blocking the lens by applying a central force on the lens side opposite to the chuck.

Upon edging, the lens should not undergo any offset of more than 2°, preferably of maximum 1°, and, therefore, the pad adhesion to the lens surface is crucial for obtaining a good edging.

To overcome these difficulties in edging lenses that are provided with an outer hydrophobic and/or oleophobic coating, it has been proposed to form on such hydrophobic and/or oleophobic coatings a temporary coating, of organic or mineral nature. For example, the European patent applications EP 1 392 613 and EP 1 633 684, to ESSILOR, describe the use of such an organic or mineral temporary coating, which increases the surface energy and thus enables the optician to perform a reliable edging of the lens. After edging, the temporary coating has to be removed so as to restore the lens outer hydrophobic and/or oleophobic coating surface properties. It goes without saying that after the temporary coating removal, the outer hydrophobic and/or oleophobic coating should possess surface properties as similar as possible to its initial properties.

Although the temporary coatings described in the European patent applications EP 1 392 613 and EP 1 633 684, after the removal thereof, lead to outer hydrophobic and/or oleophobic coatings having good surface properties and a high water static angle (typically of 112°), it is advisable to further increase this contact angle value.

If needed, after the main edging operation of the optical article, it may be wished to restart an edging operation and/or a glass drilling, the drilled area acting as a fixing point to a spectacle frame temple.

For these last steps, especially for glass drilling, it is crucial for the chuck-adhesive holding pad assembly to remain in position on the surface of the article, because it represents a mark for positioning the drills for drilling holes.

The patent application WO 2005/015270 discloses the use of a temporary protective film based on a chlorinated polyolefin resin.

The film described in this application enables performing the main edging, but it has been systematically observed that the chuck-adhesive holding pad assembly does spontaneously separate within the few seconds following this main edging operation.

From the very beginning of the edging operation, the water sprayed on the article during this edging operation seems to percolate under the temporary film, which does then wrap around itself. Under such conditions, it then becomes impossible to perform later on a restart of the edging or a glass drilling.

The patent application WO 03/057641 describes an ophthalmic lens comprising a surface coated with a hydrophobic and/or oleophobic coating, itself provided with a temporary protective coating. It is the main function of the temporary protective coating to protect the hydrophobic and/or oleophobic coating during the processing of the lens opposite surface through energetic species.

The temporary protective coating may be inorganic or organic in nature. It may be a single or a dual layer.

However, the only multilayered coating (dual-layer coating) specifically described in the application is a coating comprising a first inorganic layer, in contact with the hydrophobic and/or oleophobic coating, and, deposited on the first layer, a second organic layer.

It would also be desirable to have a temporary coating based on polyurethane, especially a dried polyurethane type latex composition.

However, these coatings do degrade over time.

In particular the coating becomes tacky and sticky.

The present inventors discovered that one reason for such degradation was the sensitivity of the coating to humidity.

Such sensitivity to humidity may also be responsible for the alteration of the adhesion properties previously mentioned, during the edging operation, whereupon water is sprayed onto the ophthalmic lens.

It is thus an object of the present invention to provide an optical article, especially an ophthalmic lens, having an outer hydrophobic and/or oleophobic coating directly coated with a temporary coating which:

has no or very little sensitivity to humidity;

after removal of the temporary coating, enables to recover an outer hydrophobic and/or oleophobic coating having properties that are almost the same as the initial properties and especially a water static contact angle that is almost the same as the initial one; and/or if needed, enables to conduct an edging restart operation; and/or enables to perform a glass drilling, the drilled area acting as a fixing point to a spectacle frame temple.

The hereabove mentioned objectives are aimed at in the present invention through an optical article having on one of its main surfaces an outer hydrophobic and/or oleophobic coating having a low surface energy, onto which is directly deposited a temporary coating, characterized in that the temporary coating is a dual-layer coating having a first layer, in direct contact with the hydrophobic and/or oleophobic coating, of a polymer selected from halogenated, especially chlorinated or fluorinated, polyolefin polymers, from polyurethanes, especially dried polyurethane type latex compositions, and a second layer, formed on the first layer, of a polymer or a polymer mixture acting as a water barrier.

The polymer(s) acting as a water barrier enable(s) the dual-layer coating to successfully pass one or both of the following tests:

1) Durability Test Under Ambient Conditions (45-50% Humidity, Temperature 20° C.):

The ophthalmic lenses are stored for 48 hours in paper liners or ophthalmic bags made from the Landouzy company (59000 France) comprising an inner fibrous pad.

At the end of the 48 hour-period, the lenses are withdrawn from their liner and a visual inspection is effected, using a natural daylight.

The inspection is performed by naked eye to control whether fibers have been torn out from the liner and adhere to the lens surface, and/or whether the cosmetic appearance of the glass has been changed (streaks or spots occurrence, if any).

The test is considered as positive, i.e. the lens does successfully pass the test, if there are no fibers adhering to the lens, therefore no sticking, and if the cosmetic control does not reveal any visual defect.

2) Drilling and Edging Test:

Here is implemented the detailed offset measurement procedure such as described hereafter, using an Essilor Kappa grinder, followed with a drilling step.

To successfully pass both of these tests, the adhesive pad should sufficiently adhere to the glass during and after the edging step for being capable of undergoing the drilling step. The dual layer placed under the adhesive pad should therefore have resist to the water spraying during the edging step.

The polymer of the first layer and the polymer of the second layer are different from each other.

Preferred polymers for the first layer are polyurethanes, especially dried polyurethane type latex compositions.

As used herein, a "polymer" is intended to include homopolymers and copolymers.

As used herein, an "optical article" is intended to mean an optically transparent, organic or mineral glass substrate, that has been treated or not depending on whether it comprises one or more coating(s) of various natures or it remains a bare substrate.

Surface energies are calculated according to the OWENS-WENDT method described in the following reference: "Estimation of a surface force energy of polymers" OWENS D. K., WENDT R. G. (1969) J. Appl. POLYM. SCI, 13, 1741-1747.

The optical articles of the invention are optical articles, especially ophthalmic lenses, which comprise an outer hydrophobic and/or oleophobic coating and preferably optical articles comprising both an outer hydrophobic and/or oleophobic coating deposited onto a mono- or a multilayered antireflective coating.

Indeed, outer hydrophobic and/or oleophobic coatings are generally applied onto optical articles comprising an antireflective coating, especially composed of a mineral material, so as to reduce their strong trend towards fouling, for example towards greasy type deposits.

As is known, outer hydrophobic and/or oleophobic coatings are obtained by applying, on the surface of the antireflective coating, compounds reducing the surface energy of the optical article.

Such compounds have been widely described in the prior art, for example in the following U.S. Pat. No. 4,410,563, EP 0 203 730, EP 749 021, EP 844 265, and EP 933 377.

Compounds based on a silane carrying fluorinated groups, especially perfluorocarbon or perfluoropolyether groups, are most preferably used.

To be mentioned as examples are silazane, polysilazane or silicone compounds comprising one or more fluorinated groups, such as previously named.

A known method consists in depositing onto the antireflective coating compounds carrying fluorinated groups and Si—R groups, wherein R represents an —OH group or a precursor thereof, preferably an alkoxy group. Such compounds may cause polymerization and/or cross-linking reactions to occur on the surface of the antireflective coating, immediately upon or after hydrolysis.

Applying the compounds reducing the surface energy of the optical article is traditionally effected by dipping into a compound-based solution, by spin-coating or by conducting a chemical vapor deposition in particular.

Generally, the outer hydrophobic and/or oleophobic coating is less than 10 nm thick, and more preferably less than 5 nm thick.

Generally, the low surface energy outer hydrophobic and/or oleophobic coating has a surface energy lower than or equal to 14 mJ/m$^2$, preferably lower than or equal to 13 mJ/m$^2$, more preferably lower than or equal to 12 mJ/m$^2$.

Preferred hydrophobic and/or oleophobic surface coatings comprise at least one fluorinated compound, more preferably at least one silane, silazane or polysilazane type compound, carrying one or more fluorinated group(s), especially fluorinated hydrocarbon, perfluorinated carbon, fluorinated polyether groups, such as a $F_3C$—$(OC_3F_6)_{24}$—O—$(CF_2)_2$—$(CH_2)_2$—O—$CH_2$—$Si(OCH_3)_3$ or a perfluoropolyether group.

A traditional method for making a hydrophobic and/or oleophobic coating consists in depositing compounds carrying fluorinated groups and Si—R groups, wherein R represents a hydroxyl group or a precursor thereof, such as a hydrolyzable group, for example a Cl, $NH_2$, NH— or —O-alkyl group, preferably an alkoxy group. They are preferably composed of fluorosilanes or fluorosilazane precursors, comprising preferably at least two hydrolyzable groups per molecule. Such compounds, when deposited onto a surface, may undergo polymerization and/or cross-linking reactions, immediately upon or after hydrolysis.

Fluorosilanes best suited to form hydrophobic and/or oleophobic coatings include those comprising fluoropolyether groups described in U.S. Pat. No. 6,277,485.

These fluorosilanes have the following general formula:

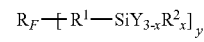

wherein $R_F$ is a monovalent or divalent polyfluoropolyether group; $R^1$ is a divalent alkylene or arylene group, or a combination thereof, optionally containing one or more heteroatoms or functional groups and optionally substituted with halogen atoms, and preferably containing 2 to 16 carbon atoms; $R^2$ is a lower alkyl group (i.e., a $C_1$-$C_4$ alkyl group); Y is a halogen atom, a lower alkoxy group (i.e., a $C_1$-$C_4$ alkoxy group, preferably, a methoxy or ethoxy group), or a lower acyloxy group (i.e., —OC(O)R$^3$, wherein R$^3$ is a C$_1$-C$_4$ alkyl group); x is 0 or 1; and y is 1 (R$_F$ is monovalent) or 2 (R$_F$ is divalent). Suitable compounds typically have a number average molecular weight of at least 1000. Preferably, Y is a lower alkoxy group and R$_F$ is a perfluoropolyether group.

Other recommended fluorosilanes have the formula:

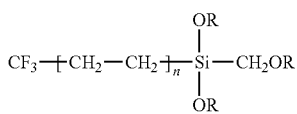

wherein n=5, 7, 9 or 11 and R is an alkyl group, preferably a C$_1$-C$_{10}$ alkyl group such as —CH$_3$, —C$_2$H$_5$ and —C$_3$H$_7$;

CF$_3$(CF$_2$)$_5$CH$_2$CH$_2$Si(OC$_2$H$_5$)$_3$ ((tridecafluoro-1,1,2,2-tetrahydro)octyl-triethoxysilane);

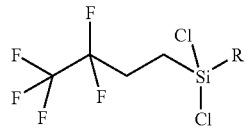

wherein n=7 or 9 and R is such as defined hereabove.

Fluorosilane-containing compositions also recommended for preparing hydrophobic and/or oleophobic coatings are described in U.S. Pat. No. 6,183,872. They comprise organic group-containing fluoropolymers carrying silicon-based groups and having the following general formula and a molecular weight of from 5.10$^2$ to 10$^5$:

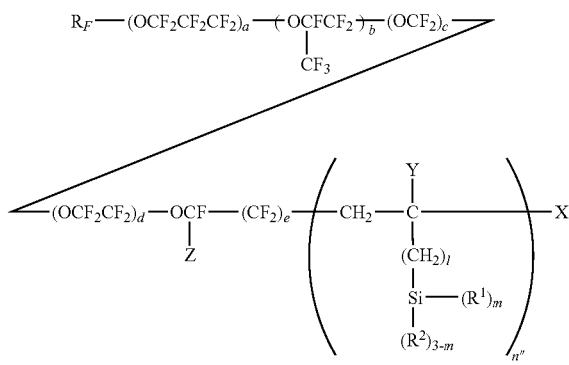

wherein R$_F$ represents a perfluoroalkyl group; Z represents a fluoro- or trifluoromethyl group; a, b, c, d and e each represent, independently from each other, 0 or an integer higher than or equal to 1, provided however that the sum of a+b+c+d+e is not less than 1 and that the order of the repeating units in brackets under a, b, c, d and e is not limited to the one illustrated; Y represents H or an alkyl group having from 1 to 4 carbon atoms; X represents a hydrogen, a bromine or an iodine atom; R$^1$ represents a hydroxyl group or a hydrolyzable group; R$^2$ represents a hydrogen atom or a monovalent hydrocarbon group, l is 0, 1 or 2; m is 1, 2 or 3; and n" is an integer being at least equal to 1, preferably at least equal to 2.

Other fluorosilane compounds to be suitably used for preparing anti-soiling coatings are described in the patents JP 2005-187936 and EP 1 300 433, and have the following formula:

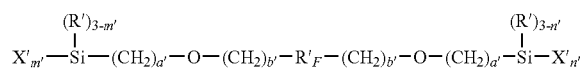

wherein R'$_F$ is a linear chain, perfluoropolyether divalent radical, R' is a C$_1$-C$_4$ alkyl radical or a phenyl radical, X' is a hydrolyzable group, a' is an integer ranging from 0 to 2, b' is an integer ranging from 1 to 5, and m' and n' are integers equal to 2 or 3.

Commercial compositions to be suitably used for preparing hydrophobic and/or oleophobic coatings are the KY130® (having the formula as given in the patent JP 2005-187936) and KP 801M® compositions marketed by the Shin-Etsu Chemical company and the OPTOOL DSX® composition (a fluorinated resin comprising perfluoropropylene groups having the formula as given in the U.S. Pat. No. 6,183,872) marketed by the Daikin Industries company. OPTOOL DSX® is the most preferred anti-soiling coating composition.

As previously stated, the temporary coating of the invention is a dual-layer coating directly deposited onto the outer hydrophobic and/or oleophobic coating.

The dual-layer temporary coating comprises a first layer, in direct contact with the hydrophobic and/or oleophobic coating, of a polymer selected from halogenated olefin polymers and polyurethanes.

Prior to performing the deposition of the first layer, it is recommended to process part of the hydrophobic and/or oleophobic surface onto which this first layer should be deposited, so as to promote the physical adhesion to the protective coating.

Such preparation consists in submitting at least part of the peripheral area of the coated main surface to a processing resulting in the removal of the hydrophobic and/or oleophobic coating and/or in the modification of said coating that lowers the hydrophobic character thereof, in at least part of this peripheral area.

As used herein, a "peripheral area or region of the lens surface" is intended to mean the area that is the farthest from the centre of the lens, and which generally has an annular configuration.

An abrasive treatment may be performed by means of an abrasive fabric or an abrasive sheet or cloth, or by any other means of the same nature. Any abrasive powder bonded to a plane (paper, cloth, cloth-lined paper, plastic) or a cylindrical support, which can be adapted to lathes, may be suitably used in the present invention. Examples of usable, natural or synthetic abrasive powders include aluminous powders such as corundum and emery; siliceous materials such as glass, sand, talc, some quartz-containing sandstones, quartz itself; pumice, garnet, flint, metal carbides, silicon carbide. An abrasive sheet may also be used, or an abrasive roll, an abrasive tape or a synthetic abrasive pad of the Scotch-Brite® type, that are marketed by 3M. An emery cloth will be preferably used, a sandpaper, a corundum paper, a steel wool or a synthetic abrasive pad.

In addition to such mechanical treatments, provided that the nature of the anti-soiling coating makes it possible—which may be easily determined by the man skilled in the art, chemical or physico-chemical treatments may be used to remove and/or to modify the anti-soiling coating that lowers the hydrophobic character thereof. These treatments may be associated with a mechanical action and in some events are intended to prepare the mechanical action.

Preferably, the processing is carried out onto at least part of an area extending from the edge of the lens up to a distance from the edge of the lens representing less than 2% of the radius of the lens, more preferably less than 1.5%, even more preferably less than 1%, and most preferably less than 0.5%, and preferably on the whole surface of such area.

The percentage of the surface of the lens face that is submitted to the processing is typically of less than 5%, preferably is of less than 3%, more preferably is of less than 2% and even more preferably is of less than 1%. For example, with a 65 mm-diameter lens, the processing will be typically performed onto a peripheral crown having a width of 0.1 to 0.2 mm, which represents less than 2% of the main face surface area.

Preferred halogenated olefin polymers are chlorinated polyolefin resins and fluorinated polyolefins.

Chlorinated polyolefin resins include chlorinated polyethylene and chlorinated polypropylene resins.

Fluorinated olefin-based polymers include homo- and copolymers of chlorotrifluoroethylene, hexafluoropropene, hexafluoroacetone, 1-hydropentafluoropropene, perfluorovinylether, perfluoromethylvinylether, trifluoroethylene, tetrafluoroethylene and vinylidene fluoride.

Preferably, the first layer of the dual-layer temporary coating is a polyurethane-based layer and still preferably a dried polyurethane type latex composition-based layer.

As used herein, a "polyurethane-based layer" is intended to mean a layer comprising at least 80% by weight of polyurethane relative to the layer total weight.

Preferably, a polyurethane-based layer is a layer of a dried polyurethane type latex composition.

As is well known, a latex is a dispersion in an aqueous medium of polymer or copolymer particles. The aqueous medium may be water, for example distilled water or deionized water, or even a mixture of water and one or more solvents, especially of water and alkanol, typically a C1 to C6 alkanol, and preferably ethanol.

In the present invention, "polyurethanes" include both (co)polymers of polyurethane strictly speaking, that is to say polymers obtained by condensing at least one polyisocyanate and at least one polyol, with optionally a chain extender, and polyurethane-urea, that is to say (co)polymers obtained by condensing at least one polyisocyanate and one polyamine, with optionally a chain extender, and combinations thereof.

Preferably, polyurethanes and polyurethane-urea of the invention result from the condensation reaction of a diisocyanate with a diol and/or a diamine. Still preferably, polyurethanes and polyurethane-urea of the invention are aliphatic, linear or cyclic polyurethanes and polyurethane-urea, that is to say obtained by condensing aliphatic, linear or cyclic polyisocyanates with aliphatic, linear or cyclic polyols and/or polyamines.

Suitable polyisocyanates to be used in the preparation of polyurethanes and polyurethane-urea of the invention, and especially preferred diisocyanates, include toluene-2,4-diisocyanate, toluene-2,6-diisocyanate, diphenylmethane-4,4'-diisocyanate, diphenylmethane-2,4'-diisocyanate, paraphenylene diisocyanate, biphenyl diisocyanate, 3,3'-dimethyl-4,4'-diphenylene diisocyanate, tetramethylene-1,4-diisocyanate, hexamethylene-1,6-diisocyanate, 2,2,4-trimethylhexane-1,6-diisocyanate, lysinemethylester diisocyanate, bis(isocyanoethyl) fumarate, isophorone diisocyanate (IPDI), ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydrodiphenylmethane-2,4'-diisocyanate, perhydrodiphenylmethane-2,4'-diisocyanate, perhydrodiphenylmethane-2,4'-diisocyanate, perhydrophenylmethane-4,4'-diisocyanate (or bis-(4-isocyanatocyclohexyl)-methane, or 4,4'-dicyclohexylmethane diisocyanate) and their mixtures.

Preferred polyisocyanates are aliphatic diisocyanates such as hexamethylene-1,6-diisocyanate, isophorone diisocyanate, ethylene diisocyanate, dodecane-1,12-diisocyanate, cyclohexane-1,3-diisocyanate, bis-(4-isocyanato-cyclohexyl)-methane and their mixtures. Isophorone diisocyanate is the most preferred diisocyanate.

Other polyisocyanates suitable for preparing polyurethanes and polyurethane-urea of the invention are described in detail in WO 98/37 115.

Polyols to be suitably used for preparing polyurethanes of the invention include pentaerythritol, trimethylol ethane, trimethylol propane, di(triethylol propane) dimethylol propionic acid, ethylene glycol, 1,2- and 1,3-propylene glycol, 1,2-butanediol, 1,4-butenediol, 1,3-butanediol, 2,3-butanediol, 2,2,4-trimethyl-1,3-pentanediol, 1,5-pentanediol, 2,4-pentanediol, 1,6-hexanediol, 2,5-hexanediol, 1,8-octanediol, 2-methyl-1,3-pentadiol, 2,4-heptanediol, 2-ethyl-1,3-hexanediol, 2-methyl-1,3-propanediol, 2,2-dimethyl-1,3-propanediol (neopentylglycol), 1,4-cyclohexanediol, 2,2-dimethyl-3-hydroxypropyl-2,2-dimethyl-3-hydroxypropionate, 1,2,6-hexanetriol, 1,2,4-butanetriol, glycerol, sorbitol, mannitol, diethylene glycol, triethylene glycol, tetraethylene glycol, dipropylene glycol, tripropylene glycol, dibutylene glycol, 1,4-bis(hydroxymethyl)cyclohexane, 1,2-bis(hydroxymethyl)cyclohexane, 1,2-bis(hydroxyethyl)cyclohexane, bis(hydroxypropyl)lantoines, and trishydroxyethyl isocyanurate.

Preferred polyols are aliphatic diols and especially polypropylene glycol.

Another class of polyols that can be suitably used for preparing polyurethanes and polyurethane-urea of the invention include polyether polyols such as polyoxyalkylene polyols, polyalkoxylated polyols such as poly(oxytetramethylene)diols and their mixtures.

Preferred polyamines include diamines, especially linear and cyclic, aliphatic diamines.

To be mentioned amongst diamines are diaminomethane, ethylene diamine, 1,2-diaminopropane, 1,3-diaminopropane, 1,4-diaminobutane, 1,6-diaminohexane, 1,4-diaminocyclohexane, 4,4'-diaminodicyclohexylmethane, 1-amino-3-aminomethyl-3,5,5-trimethylcyclohexane, and trimethylamine.

Amino alcohols may also be suitably used for preparing polyurethanes and polyurethane-urea of the invention, such as monoethanol amine and diethanol amine.

Polyurethanes as well as the method for making the same are described inter alia in the U.S. Pat. No. 6,187,444.

Preferably, polyurethanes of the invention do not comprise acrylic or methacrylic functionalities, and especially no polymerizable acrylic or methacrylic functionalities.

Polyurethane type latexes to be suitably used in the present invention are commercially available, for example from the BAXENDEN company under the trade names W 234 and W 240 (polyurethane-urea) or under the trade name Pellimer TC® (polyurethane-urea) from the SOCOMOR company and PROXR 910® (polyurethane) from the SYNTRON company.

Pellimer TC® will be used thereafter after dilution with water. (A combination is prepared with 80% by weight of Pellimer TC® and 20% by weight of water). The resulting mixture will be thereafter referred to as TC80F.

Polyurethane type latex compositions of the invention may of course result from the combination of polyurethane latexes, especially commercially available polyurethane latexes.

In a particular embodiment of the invention, polyurethane type latex composition further comprises a small amount, up to 10% by weight of the composition, of a (meth)acrylic latex, preferably an acrylic latex. Preferably, the amount by weight of (meth)acrylic latex does range from 0.1 to 10% by weight and more preferably from 2 to 6% by weight relative to the latex composition total weight.

The solid content by weight in the acrylic latex relative to the composition solid content total weight does also preferably range from 0.1 to 10% by weight, and more preferably from 2 to 6% by weight.

It is an advantage of the (meth)acrylic latex, from the one hand, to reduce the hydrophilic character of the material and, from the other hand, to make the dried final layer more rigid and reduce the elongation at break thereof.

These (meth)acrylic latexes are commercially available, especially from the SYNTRON company under the trade names PROXAM 185 RS® (acrylic resin), PROXAM 157® (acrylic copolymer), PROXAM N 360® (acrylic copolymer).

Preferably, the PU type latex compositions of the invention do not comprise magnesium or mineral colloidal particles.

Generally, the PU type latex compositions of the invention preferably further comprise one or more surfactant(s), typically in an amount of from 0.5 to 10% by weight relative to the latex composition total weight, preferably of from 0.5 to 6% by weight.

Generally, the PU type latex compositions of the invention have a solid content (dry matter) of from 25 to 55% by weight, preferably of from 25 to 50%, more preferably of from 25 to 45% by weight relative to the latex composition total weight.

Their viscosity at room temperature does preferably range from 5 to 50 cp, and more preferably from 7 to 46 cp.

The second layer of the dual-layer temporary coating is formed by any polymer different from that of the first layer, which may be selected from vinyl polymers, polyepoxides, polyepisulfides, polyesters, polyethers, polyester-ethers, polythio(meth)acrylates, poly(meth)acrylates, styrene-based polymers, cellulose-based polymers and their mixtures.

The second layer has a sufficiently high surface energy to make the holding pad adhere to its surface. The function of the surface energy has been described in the patent application EP 1 392 613.

In addition to its water barrier function, the second layer also acts, if needed, to prevent the surfactants, especially the surfactants of the acrylic copolymer type which could have migrate to the surface of the first layer over time, from being in contact with the air.

Vinyl polymers include poly(vinyl acetate), poly(vinyl phenol), poly(vinyl pyrrolidone) and poly(vinylpyrrolidone-vinyl acetate). Poly(vinyl acetate) is the most preferred vinyl polymer.

Cellulosic polymers include alkylcellulose polymers, for example based on ethylcellulose, and hydroxyalkylcellulose polymers, for example based on hydroxypropylcellulose.

Preferably, the cellulosic polymer is used in an amount of from 3 to 15% by weight, more preferably from 3 to 10% by weight, in an organic solvent medium.

Said organic solvent used for the cellulosic polymer is preferably an alcoholic type of solvent, a ketone solvent or a combination of both solvents.

(Meth)acrylic polymers include polyacrylates, polymethacrylates, for example methyl polymethacrylate.

Especially, the second layer of the dual-layer temporary coating may be formed from a poly(meth)acrylic latex dried composition.

Poly(meth)acrylic latexes are latexes based mostly on (meth)acrylate type copolymers, such as for example ethyl, butyl, methoxyethyl or ethoxyethyl (meth)acrylate, optionally together with a generally minor amount of at least one other comonomer, such as for example styrene.

Preferred poly(meth)acrylic latexes are latexes of acrylate and styrene copolymers. Such latexes of acrylate and styrene copolymers are commercially available from the ZENECA RESINS company under the trade name NEOCRYL®.

Polymers that are particularly preferred for the second layer include poly(meth)acrylates and cellulosic polymers, especially polyacrylates and polyalkyl and polyhydroxyalkylcelluloses. Cellulosic polymers give the best results in the context of the invention.

The layers of the dual-layer temporary coating of the invention may be deposited by any type of means, but preferably by dip-coating, spin-coating, spraying, or by brush-coating, preferably by dip-coating.

The deposition may be effected on the whole surface of the lens side intended to receive the holding adhesive pad or on part thereof, especially on the central part of the lens.

In one embodiment, the layers of the temporary coating may be deposited onto the central part by means of a brush.

Preferably, the temporary layer is optically inactive, that is to say it enables measuring the power using traditional measuring means such as a frontofocometer.

The first layer of the dual-layer temporary coating of the invention has typically a thickness ranging from 10 to 40 μm, preferably from 15 to 30 μm and more preferably from 15 to 20 μm.

The second layer of the dual-layer temporary coating has typically a thickness ranging from 15 to 25 μm.

Preferably the dual-layer temporary coating of the invention is a strippable coating. The coating may be removed manually by stripping it off. Both layers are to be removed at the same time.

The following examples illustrate the present invention. In these examples, unless otherwise stated, all parts and percentages herein are expressed in weight.

1. PU LATEX COMPOSITION USED FOR MAKING THE FIRST LAYER OF THE DUAL-LAYER TEMPORARY COATING

|  | Weight (g) |
| --- | --- |
| Pu latex PROX R 910 ® | 910.48 |
| Acrylic latex PROX AM 185 RS ® | 35.24 |
| Acrylic copolymer ACTIRON F 484 ® (surfactant) | 6.67 |
| Acrylic copolymer MODAREZ PW 336 ® (surfactant) | 47.62 |

To a beaker are successively added the Pu latex, the acrylic latex, then the surfactants, whereupon the mixture is placed under stirring in a RAYNERIE (deflocculating turbine of 35 mm diameter) starting at reduced speed and increasing progressively the speed to 1800 rpm, thereafter the stirring is continued for about 2,5 hours.

The mixture is allowed to stand overnight (microbubble removal) before use.

2. EXAMPLE

On polycarbonate (PC) lenses (power: −8.00 cylinder: +2.00 diameter, 65 mm and central thickness 1.1 mm) beforehand coated, in the stated order, with an anti-abrasion coating, an antireflection coating and an outer hydrophobic and/or oleophobic coating (OPTOOL DSX, programmed thickness 14 nm corresponding to approx. 2-5 nm of actual thickness) as described in Example 1 of the patent EP 1 392 613.

Prior to depositing the latex layer, the lenses undergo an abrasive surface treatment, at the annular periphery of the lens using an emery cloth abrasive paper (Norton R222 type) with a 180 fine grit.

The first formed layer of the dried latex composition described hereabove was then obtained through dip-coating by using a dip-coating machine at a dewetting rate of 1 mm/s and a waiting time of 10 seconds. The coated samples of this temporary coating first layer were then dried in an oven at 50° C. for 2 hours. The first PU layer had a thickness ranging from 15 to 20 μm.

The temporary coating second layer, as defined in the following Table was formed through dip-coating as before, except the acrylic composition which has been deposited through spin-coating. The nature of the polymer compositions for the second layer, as well as the drying temperatures and the drying times are given in Table I hereunder.

TABLE I

| Glass N° | Polymer | Drying temperature ° C. | Drying time |
|---|---|---|---|
| 1 | PVAC | 50° C. | 2 h |
| 2 | Ethylcellulose | 20° C. | 2 h |
| 3 | Acrylic type | Room temperature under UV radiation | 75 seconds UV radiation H+ lamp |

PVAC: vinyl polyacetate 19.9% Methyl ethyl ketone 80.1%

Ethylcellulose: Ethylcellulose (Aldrich) 4.8% Acetone 57.1%

Ethylacetoacetone 38.1%

Acrylic type: polymerizable formulation based on Sartomer ingredients composed of:

SR506d isobornyl acrylate) 120.02 g
SR508 (dipropylene glycol diacrylate) 30.07 g
SR610 (polyethylene glycol 600 diacrylate) 30.04 g
SR399 (dipentaerythritol pentaacrylate) 59.99 g
CN965 (urethane acrylate aliphatic oligomer) 180.07 g
Darocur 1173 (Ciba) 0.28 g The acrylic layer deposition is effected through spin-coating:

Upon deposition (dispense): the lens rotates at 500 rpm (duration 15 seconds), then the rotation speed is increased to 2350 rpm for 10 seconds.

The acrylate varnish is polymerized in a fusion UV oven fitted with a H+ lamp for 5×15 seconds.

Edging and drilling assays were performed on samples. The storage behavior in liners was also measured. Results are given in Table II hereunder.

TABLE II

| Glass N° | Spreading | Cosmetics | Edging | Drilling | Peeling off | Storage |
|---|---|---|---|---|---|---|
| 1 | OK | OK | OK | OK | OK | OK |
| 2 | OK | OK | OK | OK | OK | OK |
| 3 | OK | OK | OK | No | OK | OK |

Comparative:

the lens that was only coated with a Pu latex monolayer (without deposition of a second layer) does not successfully pass the storage test under humid conditions for 3 months.

Spreading:

the ophthalmic lenses are controlled visually (naked-eye examination) after withdrawal immediately after the dip-coating of the first layer (Pu latex layer) in order to check that the layer indeed forms a continuous film on the whole convex surface (front face) of the lens. If so, the lens is noted OK, otherwise the lens is noted NO.

Cosmetics:

the lenses, after the dual-layer deposition are controlled visually (naked-eye examination) as regards transmission and reflection under natural light, so as to detect the presence of any optical defect (sags, spots). If there are no optical defect, the lens is noted OK.

Peeling Off:

the lens is noted OK if the dual layer can be withdrawn manually in one single piece without disintegrating.

Offset Measuring Procedure for Lenses Submitted to an Edging or a Trimming Operation I. Test Description The edging test is performed on an Essilor Kappa grinder.

The dual-layer lenses are edged so as to give them a frame template specific shape (see hereunder).

The following equipment is required for the test to be performed:

Essilor CLE 60 frontofocometer (for glass pointing and final inspection).

Essilor Kappa digital equipment (tracer-blocker-grinder).

Frame template of the Charmant type reference 8320, model 05, size 51.

Pseudo frame for control.

Adhesive dot or holding adhesive pad LEAP II, 24 mm diameter, GAM200 from the 3M company.

Essilor chuck for receiving the adhesive dot.

II. Sampling and Mounting Parameters

The retained mounting dimensions are as follows:

Height: Half-height boxing i.e.

PD (right and left)=32 mm and axis=90°

The trimming cycle used is a cycle adapted to the material (plastic cycle for low refractive index, polycarbonate cycle for PC and cycle for substrates having a mean refractive index MHI). The retained clamping pressure is the brittle glass pressure option of the grinder.

III. Controls

After edging, controls are performed so as to determine whether the edging operation succeeded.

Controls are performed using the frontofocometer CLE 60 by pointing the lenses held in the pseudo-frame. Axes are registered during this phase.

If the lens, after the edging operation cannot be inserted into the pseudo-frame or if the lens can be inserted into the pseudo-frame, but with an offset of more than 2°, the lens is non-compliant and does not pass the test successfully. It is noted "NO" in the result table.

If the glass offset is lower than 2°, the lens passes the test and is noted "OK" in the result table.

Drilling after Edging

After the edging operation, the lens and chuck-adhesive pad assembly, with the clamping device/adhesive pad firmly adhering to the lens is placed in an Optidrill or Minima2 drilling machine and held in position by a blocking device.

The lens is then drilled
either manually with the Minima 2 drilling machine provided with a drill of 2.2 mm diameter, rotating at 3500 rpm,
or automatically with the Optidrill Evo drilling machine provided with a drill of 2.2 mm diameter, rotating at 12000 rpm.

After drilling, the blocking system is unlocked and the drilled lens is recovered together with the chuck-adhesive pad assembly.

Then the clamping device is removed and the drilled lens is recovered.

When the lens can be positioned in the drilling device and therefore passes the drilling operation successfully, it is noted "OK" in Table II. If not, it is noted "NO".

Storage Behaviour

Two tests are successively carried out:

1) Storage Test Under Ambient Conditions (45-50% Humidity, Temperature 20° C.):

The ophthalmic lenses are stored for 48 hours in paper liners or ophthalmic bags made from the Landouzy company (59000 France) and comprising a fibrous pad.

A the end of the 48 hour-period, the lenses are withdrawn from their liner and controlled visually.

The inspection is performed by naked eye to control whether fibers have been torn out from the liner and adhere to the lens surface, and whether the cosmetic appearance of the glass has been changed (streaks or spots occurrence, if any).

If this first test is positive, that is to say if there are no fibers adhering to the lens, therefore no sticking, and if the cosmetic control does not reveal any visual defect, the lens is then submitted to the second test.

2) Storage Test Under High Humidity Conditions:

The ophthalmic lenses inserted into the same liners as hereabove are stored for 3 months in a temperature- and hygrometry-regulated climatic chamber (40° C.° and 80% humidity).

At the end of the 3 month-period, the same visual tests as hereabove are performed.

If the ophthalmic lens does successfully pass both tests, it is noted OK in Table II hereabove. Otherwise, it is noted NO.

The invention claimed is:

1. An optical article which is optically transparent comprising an organic or mineral glass substrate comprising on at least one of its main surfaces an outer hydrophobic and/or oleophobic coating and in direct contact with the outer hydrophobic and/or oleophobic coating a dual-layer temporary coating protecting said outer hydrophobic and/or oleophobic coating before and/or during an edging process, wherein the dual-layer temporary coating is removable and consists of:
a first layer, in direct contact with the outer hydrophobic and/or oleophobic coating comprising halogenated olefin polymers or polyurethanes, wherein the polyurethanes, if present, represent at least 80% by weight of the total weight of the first layer; and
a second layer which is the outermost layer of the optical article, comprising a polymer or polymer mixture acting as a water barrier deposited on the first layer, wherein the second layer comprises at least one vinyl polymer, polyepoxide, polyepisulfide, polyester, polyether, polyester-ether, poly(meth)acrylate, polythio(meth)acrylate, styrene polymer, or cellulosic polymer wherein the polymer of the first layer and the polymer of the second layer are different from each other.

2. The optical article of claim 1, wherein the first layer of the temporary coating is a polyurethane layer.

3. The optical article of claim 2, wherein the polyurethane layer is a layer of a dried polyurethane based latex composition.

4. The optical article of claim 3, wherein the polyurethane based latex composition comprises at least one poly(meth)acrylic latex.

5. The optical article of claim 4, wherein the poly(meth)acrylic latex is a polyacrylic latex.

6. The optical article of claim 4, wherein the poly(meth)acrylic latex represents from 0.1 to 10% by weight of the composition.

7. The optical article of claim 6, wherein the poly(meth)acrylic latex represents from 2 to 6% by weight of the composition.

8. The optical article of claim 1, wherein the polymer of the second layer comprises a polyacrylate, polyalkylcellulose, or polyhydroxyalkylcellulose.

9. The optical article of claim 1, wherein the temporary coating is a strippable film.

10. The optical article of claim 1, wherein the outer hydrophobic and/or oleophobic coating is deposited on a mono- or multilayered antireflection coating.

11. The optical article of claim 1, further defined as an ophthalmic lens.

12. The optical article of claim 1, wherein the outer hydrophobic and/or oleophobic coating comprises compounds carrying fluorinated groups and Si—R groups, wherein R represents a hydroxyl group or a precursor thereof.

13. The optical article of claim 1, in which said second layer comprises at least one vinyl polymer, polyepoxide, polyepisulfide, polyester, polyether, polyester-ether, styrene polymer, or cellulosic polymer.

* * * * *